US008661656B2

(12) United States Patent
Chawgo

(10) Patent No.: US 8,661,656 B2
(45) Date of Patent: Mar. 4, 2014

(54) HYDRAULIC COMPRESSION TOOL FOR INSTALLING A COAXIAL CABLE CONNECTOR AND METHOD OF OPERATING THEREOF

(75) Inventor: Shawn Chawgo, Cicero, NY (US)

(73) Assignee: John Mezzallingua Associates, LLC, Liverpool, NY (US)

( * ) Notice: Subject to any disclaimer, the term of this patent is extended or adjusted under 35 U.S.C. 154(b) by 43 days.

(21) Appl. No.: 13/041,257

(22) Filed: Mar. 4, 2011

(65) Prior Publication Data

US 2012/0222295 A1 Sep. 6, 2012

Related U.S. Application Data

(62) Division of application No. 11/900,124, filed on Sep. 10, 2007, now Pat. No. 7,908,741.

(51) Int. Cl.
*B23P 19/00* (2006.01)
*H01R 43/00* (2006.01)

(52) U.S. Cl.
USPC .................... 29/748; 29/863; 29/751; 29/753

(58) Field of Classification Search
USPC ............ 29/748, 863, 751, 753; 439/156, 394, 439/578, 584, 585
See application file for complete search history.

(56) References Cited

U.S. PATENT DOCUMENTS 2,102,645 A 12/1937 Replogle
2,182,663 A * 12/1939 Eby et al. ........................ 29/517
2,371,423 A 3/1945 Buchet
2,554,328 A 5/1951 Grimes
2,805,591 A 9/1957 Widmer
3,299,496 A 1/1967 Christensen
3,315,337 A 4/1967 Stull
3,325,885 A 6/1967 Ziegler, Jr. et al.

(Continued)

FOREIGN PATENT DOCUMENTS

CN 2347538 11/1999
CN 1706332 12/2005

(Continued)

OTHER PUBLICATIONS

U.S. Appl. No. 12/911,820, filed Oct. 26, 2010.

(Continued)

*Primary Examiner* — Peter DungBa Vo
*Assistant Examiner* — Jeffrey T Carley
(74) *Attorney, Agent, or Firm* — Hiscock & Barclay LLP

(57) ABSTRACT

A hydraulic compression tool for securing a compression type cable connector to a prepared end of a coaxial cable. The tool can include a hydraulic assembly having an axially extendable ram, and a connector frame detachably attached to the hydraulic assembly. The connector frame can include a cable cradle configured to accommodate cables of various sizes and a sleeve for engaging a cable connector. The connector frame can further include a sliding guide structure attached to the cable cradle. The sliding guide structure can include a sliding bar and one or more sliding guides. The sleeve can be attached to the sliding bar. The sleeve can be configured to accommodate connectors of various sizes. Activating the hydraulic assembly can cause the ram to extend, which, in turn, can cause the sliding bar to move along the longitudinal axis of the cable connector compressing the compression member and connector body into operative engagement with the cable.

6 Claims, 8 Drawing Sheets

(56) References Cited

U.S. PATENT DOCUMENTS

| | | | | |
|---|---|---|---|---|
| 3,334,511 | A | 8/1967 | Hawkins | |
| 3,365,927 | A | 1/1968 | Lynch | |
| 3,374,521 | A | 3/1968 | Clarke | |
| 3,423,987 | A | 1/1969 | Kingler | |
| 3,477,120 | A | 11/1969 | Werner et al. | |
| 3,495,670 | A | 2/1970 | Ditson | |
| 3,644,989 | A | 2/1972 | Morby et al. | |
| 3,653,115 | A | 4/1972 | Perkins | |
| 3,660,883 | A | 5/1972 | Hoeckele | |
| 4,005,516 | A | 2/1977 | Bakermans | |
| 4,136,549 | A | 1/1979 | Lytle et al. | |
| 4,170,125 | A | 10/1979 | Minka | |
| 4,174,560 | A | 11/1979 | Senior et al. | |
| 4,178,669 | A | 12/1979 | Hara et al. | |
| 4,189,817 | A | 2/1980 | Moebius | |
| 4,257,135 | A | 3/1981 | Moebius | |
| 4,386,461 | A | 6/1983 | Plummer | |
| 4,498,563 | A | 2/1985 | Trahan | |
| 4,730,385 | A | 3/1988 | Ryan et al. | |
| 4,774,762 | A | 10/1988 | Gobeil | |
| 4,785,517 | A | 11/1988 | Takano | |
| 4,932,091 | A | 6/1990 | Krzyzanski | |
| 5,000,155 | A | 3/1991 | Gallagher | |
| 5,099,561 | A | 3/1992 | Santiago Lozano | |
| 5,105,648 | A | 4/1992 | Steiner et al. | |
| 5,138,864 | A | 8/1992 | Tarpill | |
| 5,222,292 | A | 6/1993 | Comerci et al. | |
| 5,297,312 | A | 3/1994 | Zuiderveen et al. | |
| 5,363,834 | A | 11/1994 | Stuchlik | |
| 5,367,756 | A | 11/1994 | Huetinck | |
| 5,375,309 | A | 12/1994 | Dunn | |
| 5,392,508 | A | 2/1995 | Holliday et al. | |
| 5,398,394 | A | 3/1995 | Hyatt et al. | |
| 5,402,561 | A | 4/1995 | Cerquone et al. | |
| 5,483,731 | A | 1/1996 | Prendel et al. | |
| 5,537,727 | A | 7/1996 | Mayer | |
| 5,550,059 | A | 8/1996 | Boger et al. | |
| 5,596,800 | A | 1/1997 | Holliday et al. | |
| 5,615,292 | A | 3/1997 | Beckwith | |
| 5,647,119 | A | 7/1997 | Bourbeau et al. | |
| 5,680,687 | A | 10/1997 | Hyatt et al. | |
| 5,722,147 | A | 3/1998 | Brazle | |
| 5,743,131 | A | 4/1998 | Holliday et al. | |
| 5,749,604 | A | 5/1998 | Williams | |
| 5,802,690 | A | 9/1998 | Bullock | |
| 5,845,393 | A | 12/1998 | DePaiva | |
| 5,934,137 | A | 8/1999 | Tarpill | |
| 5,941,120 | A | 8/1999 | Jee | |
| 6,026,897 | A | 2/2000 | Pringle et al. | |
| 6,089,913 | A | 7/2000 | Holliday | |
| 6,112,404 | A | 9/2000 | Tarpill | |
| 6,116,069 | A | 9/2000 | Holliday | |
| 6,131,261 | A | 10/2000 | Michlin | |
| 6,146,141 | A | 11/2000 | Schumann | |
| 6,205,653 | B1 | 3/2001 | Perez et al. | |
| 6,220,074 | B1 | 4/2001 | Montminy et al. | |
| 6,227,030 | B1 | 5/2001 | Lefavour et al. | |
| 6,230,542 | B1 | 5/2001 | Frenken | |
| 6,272,738 | B1 | 8/2001 | Holliday et al. | |
| 6,276,186 | B1 * | 8/2001 | Frenken | 72/453.15 |
| 6,293,004 | B1 | 9/2001 | Holliday | |
| 6,324,739 | B1 | 12/2001 | Fujii et al. | |
| 6,347,450 | B1 | 2/2002 | Langlois et al. | |
| 6,363,560 | B1 | 4/2002 | Kesinger | |
| 6,415,499 | B1 | 7/2002 | Holland et al. | |
| 6,446,482 | B1 | 9/2002 | Heskey et al. | |
| 6,532,790 | B2 | 3/2003 | Frenken | |
| 6,536,103 | B1 | 3/2003 | Holland et al. | |
| 6,550,119 | B2 | 4/2003 | Ishida et al. | |
| 6,551,128 | B2 | 4/2003 | Asai et al. | |
| 6,591,487 | B2 | 7/2003 | Chang | |
| 6,594,888 | B2 | 7/2003 | Chang et al. | |
| 6,658,711 | B1 | 12/2003 | Benson | |
| 6,671,944 | B2 | 1/2004 | Holliday et al. | |
| 6,676,446 | B2 | 1/2004 | Montena | |
| 6,684,679 | B2 | 2/2004 | Hsieh | |
| 6,691,402 | B2 | 2/2004 | Chang | |
| 6,708,396 | B2 | 3/2004 | Holliday | |
| 6,718,870 | B1 | 4/2004 | Frenken | |
| 6,732,393 | B1 | 5/2004 | Liao | |
| 6,733,336 | B1 | 5/2004 | Montena et al. | |
| 6,769,173 | B2 | 8/2004 | Chadbourne | |
| 6,780,052 | B2 | 8/2004 | Montena et al. | |
| 6,792,789 | B1 | 9/2004 | Faucher | |
| 6,807,728 | B2 | 10/2004 | Griffin et al. | |
| 6,808,415 | B1 | 10/2004 | Montena | |
| 6,820,326 | B1 | 11/2004 | Tarpill et al. | |
| 6,848,940 | B2 | 2/2005 | Montena | |
| 6,887,103 | B2 | 5/2005 | Montena et al. | |
| 6,901,647 | B2 | 6/2005 | Foster et al. | |
| 6,948,234 | B1 | 9/2005 | Steiner | |
| 7,028,393 | B2 | 4/2006 | Wei | |
| 7,029,326 | B2 | 4/2006 | Montena | |
| D520,828 | S | 5/2006 | Steiner | |
| 7,070,447 | B1 | 7/2006 | Montena | |
| 7,096,573 | B2 | 8/2006 | Holliday | |
| 7,120,997 | B2 | 10/2006 | Islam et al. | |
| 7,124,608 | B2 | 10/2006 | Goop | |
| 7,124,619 | B1 | 10/2006 | Lefavour et al. | |
| 7,131,868 | B2 | 11/2006 | Montena | |
| 7,152,309 | B2 | 12/2006 | Liao | |
| 7,165,439 | B2 | 1/2007 | Lefavour et al. | |
| 7,188,507 | B2 | 3/2007 | Holliday et al. | |
| 7,225,532 | B2 | 6/2007 | Wei | |
| 7,255,598 | B2 | 8/2007 | Montena et al. | |
| 7,275,293 | B2 | 10/2007 | Wathey | |
| 7,299,542 | B2 | 11/2007 | Montena | |
| 7,299,543 | B2 | 11/2007 | Montena | |
| 7,318,272 | B1 | 1/2008 | Steiner | |
| 7,322,085 | B1 | 1/2008 | Benson | |
| 7,346,980 | B2 | 3/2008 | Liao | |
| 7,363,799 | B2 | 4/2008 | Hamm et al. | |
| 7,421,768 | B2 | 9/2008 | Chiang | |
| 7,426,782 | B2 | 9/2008 | Johnson et al. | |
| 7,444,744 | B2 | 11/2008 | Caveney et al. | |
| 7,475,475 | B2 | 1/2009 | Sullivan | |
| 7,506,531 | B1 | 3/2009 | Lendway, IV et al. | |
| 7,562,442 | B2 | 7/2009 | Montena | |
| 7,908,741 | B2 | 3/2011 | Chawgo | |
| 7,921,549 | B2 | 4/2011 | Chawgo et al. | |
| 2003/0150105 | A1 | 8/2003 | Araki | |
| 2003/0204943 | A1 | 11/2003 | Geurts | |
| 2004/0128814 | A1 | 7/2004 | Esson et al. | |
| 2006/0143904 | A1 | 7/2006 | Holliday | |
| 2006/0179646 | A1 | 8/2006 | Xie et al. | |
| 2006/0179647 | A1 | 8/2006 | Montena et al. | |
| 2006/0191132 | A1 | 8/2006 | Montena | |
| 2006/0236500 | A1 | 10/2006 | Oh et al. | |
| 2006/0288552 | A1 | 12/2006 | Roll et al. | |
| 2006/0292925 | A1 | 12/2006 | Chawgo | |
| 2007/0251085 | A1 | 11/2007 | Holliday et al. | |
| 2008/0010825 | A1 | 1/2008 | Chawgo | |
| 2008/0201941 | A1 | 8/2008 | Montena | |
| 2008/0263859 | A1 | 10/2008 | Wang et al. | |
| 2009/0013523 | A1 | 1/2009 | Westley et al. | |
| 2009/0014212 | A1 | 1/2009 | Malak | |
| 2009/0064754 | A1 * | 3/2009 | Chawgo | 72/453.16 |
| 2009/0144974 | A1 | 6/2009 | Sullivan | |
| 2011/0173810 | A1 | 7/2011 | Chawgo et al. | |
| 2011/0179639 | A1 | 7/2011 | Chawgo et al. | |
| 2012/0096712 | A1 | 4/2012 | Chawgo et al. | |
| 2012/0222297 | A1 | 9/2012 | Chawgo | |
| 2012/0222300 | A1 | 9/2012 | Chawgo | |

FOREIGN PATENT DOCUMENTS

| | | |
|---|---|---|
| EP | 0786228 | 7/1997 |
| GB | 1072418 | 6/1967 |
| GB | 1416360 | 12/1975 |
| TW | 477738 | 3/2002 |
| TW | M259386 | 3/2005 |

(56) References Cited

FOREIGN PATENT DOCUMENTS

OTHER PUBLICATIONS

U.S. Appl. No. 13/076,900, filed Mar. 31, 2011.
U.S. Appl. No. 13/041,264, filed Mar. 4, 2011.
U.S. Appl. No. 13/041,269, filed Mar. 4, 2011.
Office Action Jan. 29, 2010 for Chinese Patent App No. 200710180741.2.
Official Action Dec. 23, 2008 for Russian Patent App No. 2007137336.12 (040839).
PCT/US2008/075073 International Preliminary Report on Patentability / Written Opinion. Date of Mailing: Mar. 25, 2010. 6 pages.
PCT/US2008/075073 Korean Intellectual Property Office, The International Search Report and Written Opinion of International Searching Authority, dated Apr. 3, 2009. 11 pages.
U.S. Appl. No. 13/077,632, filed Mar. 31, 2011.
Office Action (Mail Date Oct. 17, 2012) for U.S. Appl. No. 13/041,269, filed Mar. 4, 2011.

* cited by examiner

HYDRAULIC COMPRESSION TOOL FOR INSTALLING A COAXIAL CABLE CONNECTOR AND METHOD OF OPERATING THEREOF

CROSS REFERENCE TO RELATED APPLICATION

This application is a divisional application claiming priority to U.S. patent application Ser. No. 11/900,124 filed Sep. 10, 2007, now U.S. Pat. No. 7,908,741 issued on Mar. 22, 2011, which is incorporated herein in its entirety.

FIELD OF THE INVENTION

This invention relates generally to installing a connector onto a coaxial cable, and specifically to a hydraulic compression tool for securing a prepared end of a coaxial cable in operative engagement with a cable connector.

BACKGROUND OF THE INVENTION

A wide variety of compression type end connectors have recently been developed for use in the cable industry. These devices have found wide acceptance because of ease of manufacture and lack of complexity in design and in use. For example, the compression type connector for use with braided coaxial cables can include a hollow body and a hollow post mounted within the body which passes through one end wall of the body, and a threaded nut that is rotatably mounted on the extended end of the post. A compression member can be mounted on the connector body and arranged to move axially into the back end of the body. One end of a coaxial cable can be prepared by stripping the back outer portions of the cable to expose the center connector. The coaxial cable can then be passed through the compression ring into the back end of the body allowing the hollow post to pass between the woven metal mesh layer of the cable and the inner dielectric layer so that the wire mesh layer and outer barrier layer are positioned in the body cavity between the post and the inner wall of the body. Installation of the connector upon the end of the prepared coaxial cable is completed by axial movement of the compression member over an inclined surface to produce a radial deformation of the compression member into operative engagement with the outer surface of the coaxial cable thus securing the connector to the end of the cable. Connectors for use with other types of cables (e.g., corrugated cables, smooth wall cables) can also include a compression member which needs to be compressed to achieve an operative engagement of the cable with the cable connector.

Although most of the compression type end connectors work well in securing the coaxial cable to the end connector, the installer oftentimes has difficulty in applying a high enough axially directed force to effectively close the connection. A force that is applied off axis will not properly deform the compression member, thus resulting in a less than successful closure between the connector and the cable. Thus, a need exists for a compression tool for installing a coaxial cable connector onto a coaxial cable which is suitable for using with different connector types and cable sizes.

SUMMARY OF THE INVENTION

It is a primary object of the present invention to provide a hydraulic compression tool for securing a compression type end connector to a prepared end of a coaxial cable.

It is a further object of the present invention to provide a hydraulic compression tool which is suitable for using with different connector types and cable sizes.

These and other objects of the present invention are attained by a hydraulic compression tool including a hydraulic assembly having an axially extendable ram, and a connector frame detachably attached to the hydraulic assembly. The connector frame can include a cable cradle configured to accommodate cables of various sizes, a sliding guide structure mounted to the cable cradle, and a sleeve for engaging a cable connector. The sliding guide structure can include a sliding bar and one or more sliding guides. The sleeve can be attached to the sliding bar. The sleeve can be configured to accommodate connectors of various sizes. Activating the hydraulic assembly can cause the ram to extend, which in turn can cause the sliding bar to move along the longitudinal axis of the cable connector compressing the compression member and connector body into operative engagement of the cable with the cable connector.

BRIEF DESCRIPTION OF THE DRAWINGS

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

FIGS. 1*a*-1*d* illustrate cross-sectional views of cable connectors of different types suitable to be installed using the hydraulic compression tool in accordance with the present invention.

Figure 1A:
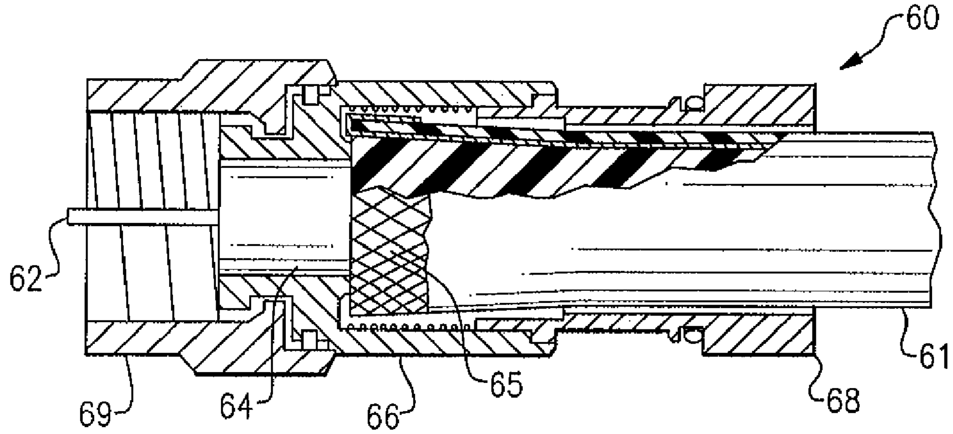
FIGS. 1*a*-1*d* illustrate cable connectors of different types suitable to be installed using the hydraulic compression tool in accordance with the present invention.
Figure 1B:
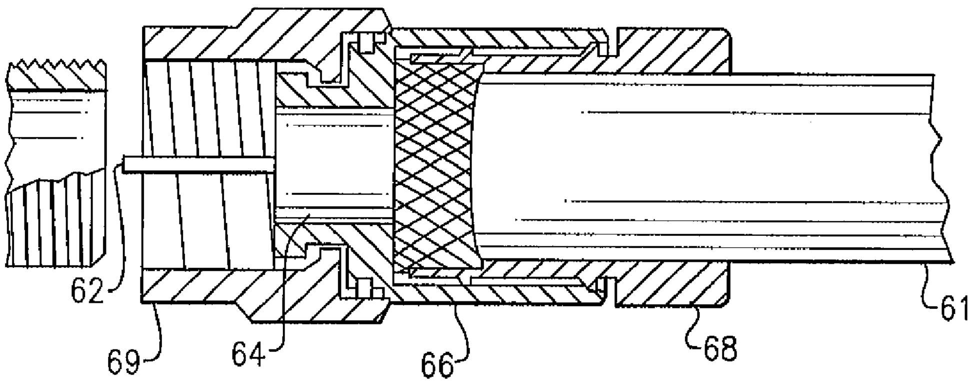

FIGS. 1*a* and 1*b* illustrate uncompressed and compressed connector for braided coaxial cables, including a cable connector 60 and a coaxial cable 61 having an end that has been prepared to accept the cable connector. A portion of the cable has been removed at the end of the cable to expose a length of the center conductor 62. In addition, a portion of the outer barrier of the cable has been removed to expose a length of the inner dielectric layer 64 and the woven wire mesh 65 which is located between the inner dielectric layer and the outer barrier is rolled back over the barrier layer. The connector includes a non-deformable main body section 66 having a hollow post contained therein and a threaded nut 69 that is rotatably secured to one end of the post. The compression member 68 is inserted into the back of the non-deformable body section and the prepared end of the cable is passed into the connector through the compression member 68 so that the hollow post passes between the woven mesh and the inner dielectric layer.

As is well known in the art, applying an axially directed force upon the connector produces radial deformation of the compression member resulting in the cable being secured in operative engagement to the cable connector.

Figure 1C:
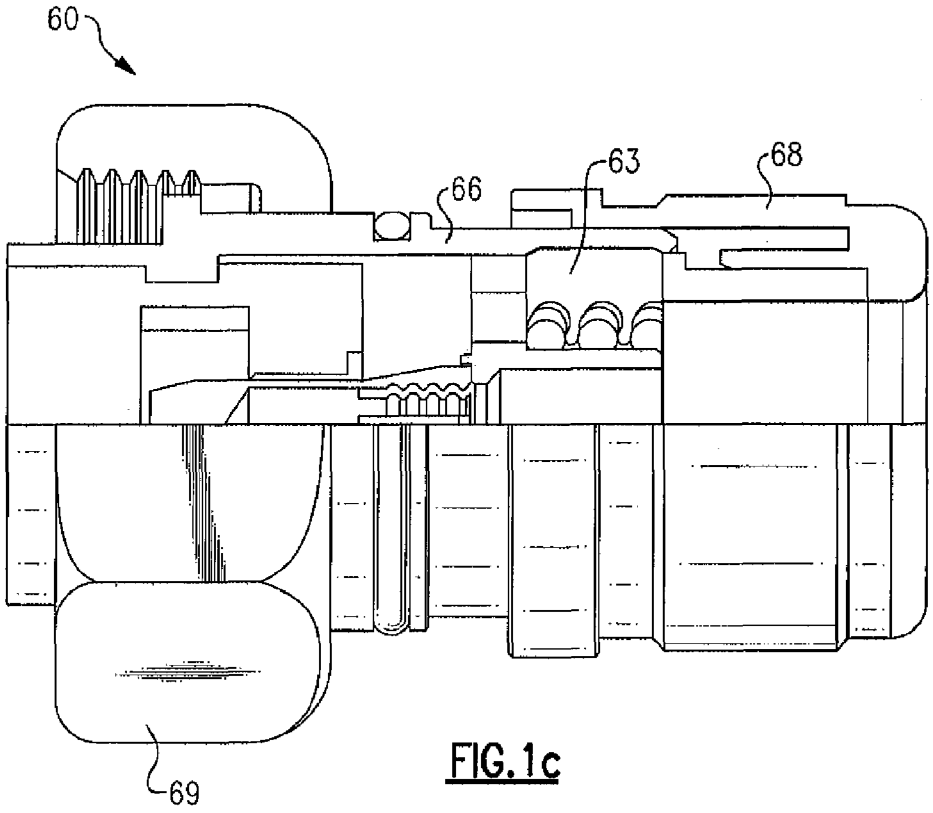
Figure 1D:
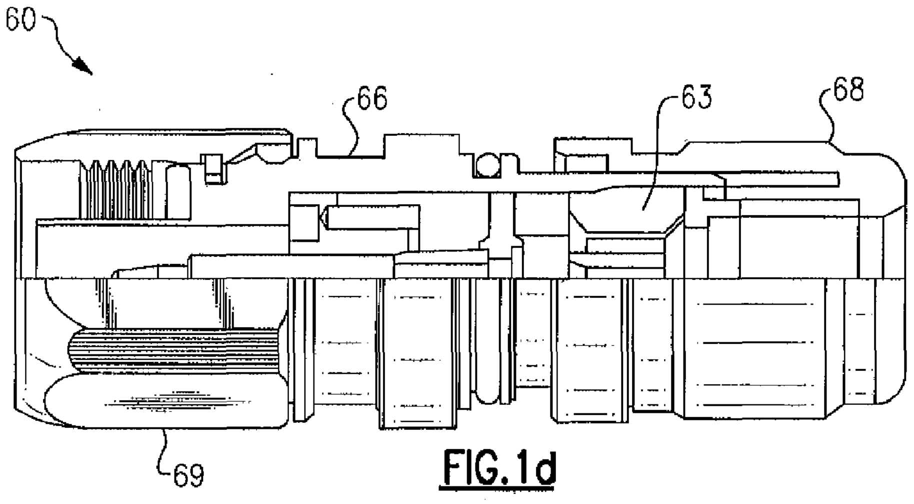

FIG. 1*c* illustrates a connector for corrugated coaxial cables. FIG. 1*d* illustrates a connector for thin wall coaxial cables. The connectors shown in FIGS. 1*c* and 1*d* are disclosed in U.S. patent application Ser. No. 11/743,633 filed on May 2, 2007.

The connectors shown in FIGS. 1*c*-1*d* include a non-deformable main body section 66 and a threaded nut 69 that is rotatably secured to one end of the connector. The compression member 68 is inserted into the back of the non-deformable body section and the prepared end of the cable 61 is passed into the connector through the compression member 68. The cable is secured by a clamp 63. As is well known in the art, applying an axially directed force upon the connector produces radial deformation of the compression member and connector body, resulting in the cable being secured in operative engagement to the cable connector.

Although specific connector types are illustrated in FIGS. 1*a*-1*d*, a skilled artisan would appreciate the fact that the compression tool in accordance with the present invention can be used with most compression type cable connectors in different interface styles that are in present day use.

Figure 2:
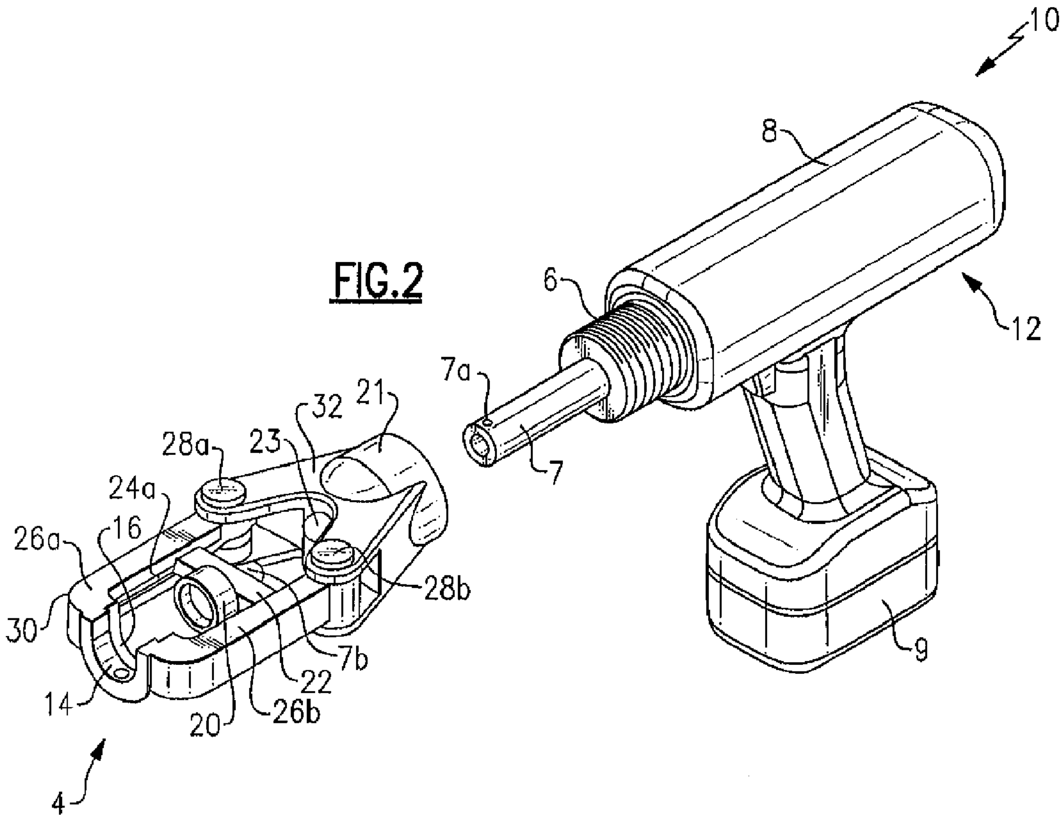
FIG. 2 illustrates one embodiment of a compression tool for installing a cable connector onto a coaxial cable.

FIG. 2 illustrates one embodiment of a compression tool for installing a cable connector onto a coaxial cable. The compression tool 10 can include a battery-operated hydraulic assembly 12, which can be provided by a commercially available assembly, e.g., model ECCX or CCCX, available from Greenlee Textron Inc. (Rockford, Ill.). The hydraulic assembly 12 can include a housing 8, a battery 9, an electric motor (not shown), a hydraulic fluid reservoir (not shown), a hydraulic pump (not shown), and a extendable ram 7. The ram 7 is extendable along the longitudinal axis of the housing 8. The ram 7 can have an orifice 7*a* intended for connecting the ram to other parts by a pin of a suitable size.

The compression tool 10 can further include a connector frame assembly 4. The connector frame assembly 4 can include a cable cradle 14. The cable cradle 14 can be configured to accommodate cables of various sizes. The cable cradle 14 can include a shoulder 16 for engaging one end of a cable connector. The other end of a cable connector can be received by a sleeve 20. The sleeve 20 can be configured to accommodate cable connectors of various sizes and various interface types. The sleeve 20 can be attached to a sliding bar 22. The sliding bar 22 and one or more sliding guides 24*a* can compose a sliding guide structure.

In one aspect, the cable cradle 14 and two parallel bars 26*a*, 26*b* can compose a U-shaped frame 30. In another aspect, the U-shaped frame 30 can be attached by two fasteners 28*a* and 28*b* to a fork 32. A skilled artisan would appreciate the fact that the frame 30 can have form factors different from illustrated herein.

The connector frame assembly 4 can have a nut portion 21. In one aspect, the nut portion 21 can be attached to the fork 32. A skilled artisan would appreciate the fact that the fork 32 can have form factors different from illustrated herein.

In one aspect, the nut portion 21 can have internal threads. The hydraulic compression assembly 12 can have an outer surface 6, at least a portion of which can have external threads. The nut portion 21 can be threadably attachable to the externally threaded surface portion. The nut portion 21 can have an opening 23 for receiving the ram 7. Orifices 7*a* and 7*b* can be aligned to insert a pin (not shown), thus connecting the ram 7 to the sliding bar 22.

Figure 3A:
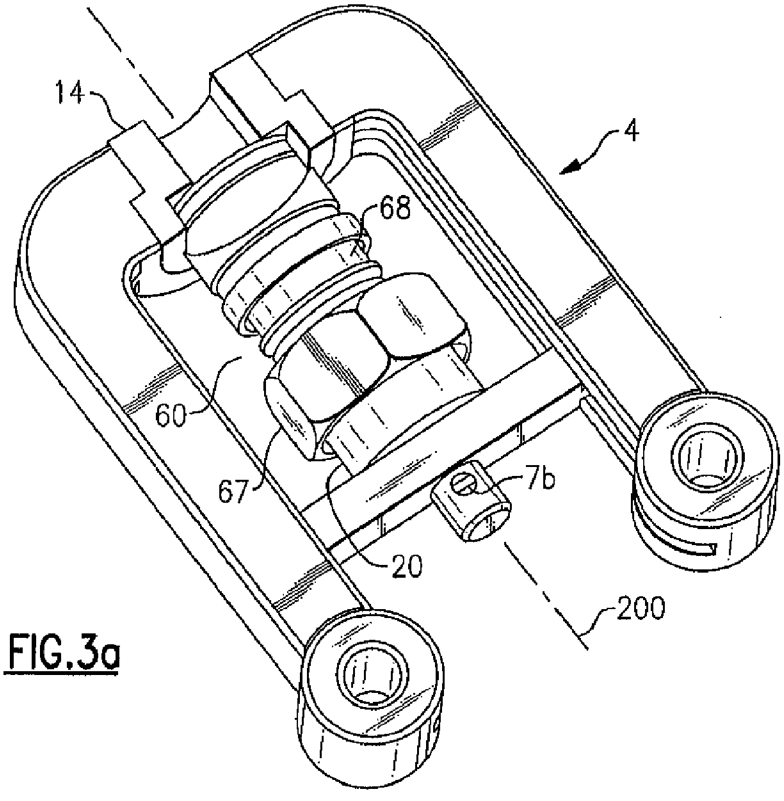
FIGS. 3*a* and 3*b* illustrate a cable connector being compressed by the hydraulic compression tool of the present invention.
Figure 3B:
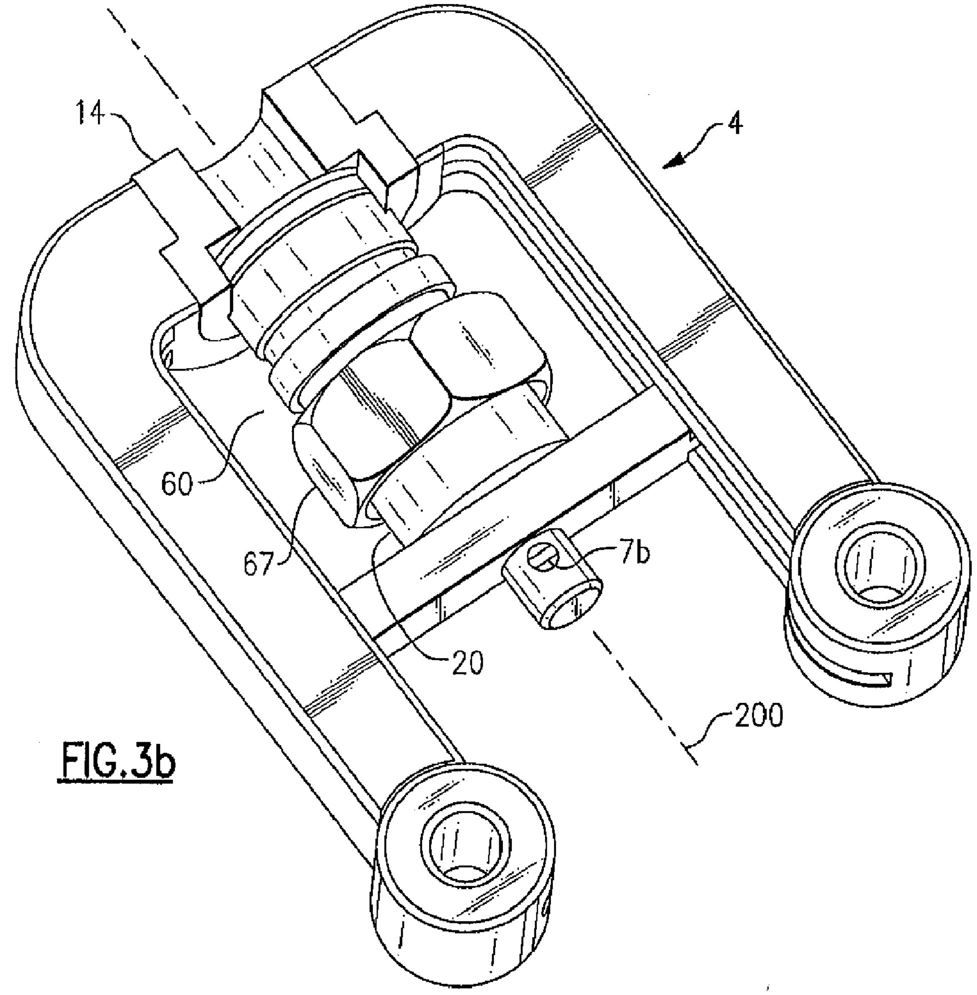

FIGS. 3*a* and 3*b* illustrate a cable connector before and after having being compressed by the hydraulic compression tool of the present invention. The cable connector 60 is placed into the connector frame assembly 4 so that the deformable section of the cable connector is received by the cable cradle 14, and the connector body 67 of the cable connector is received by the sleeve 20. A prepared end of coaxial cable (not shown) is inserted into the deformable section of the cable connector. The operator of the hydraulic compression tool activates the hydraulic assembly 12, so that the extendable ram 7 of the hydraulic assembly 12 extends and moves the sliding bar along the longitudinal axis of the cable connector, which results in the compression member 68 and connector body 66 being compressed along the longitudinal axis 200 of the cable connector, causing the coaxial cable being secured in operative engagement to the cable connector.

Figure 4A:
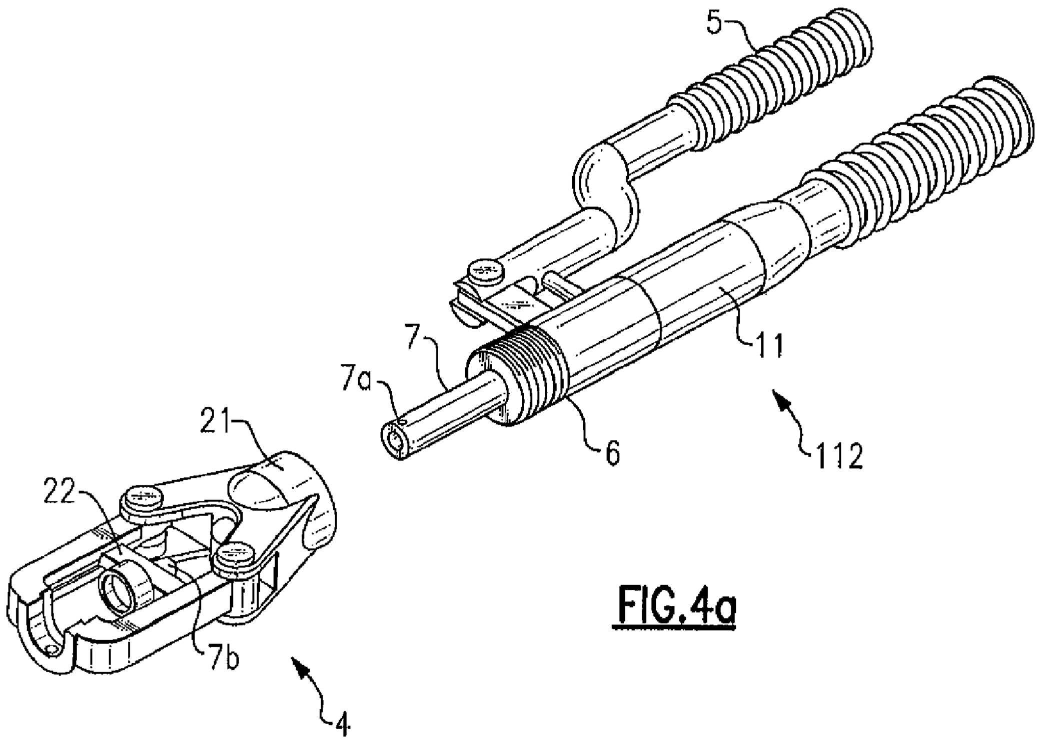
FIGS. 4*a* and 4*b* illustrate an embodiment of the present invention, where the hydraulic assembly is provided by a manually operated hydraulic assembly.
Figure 4B:
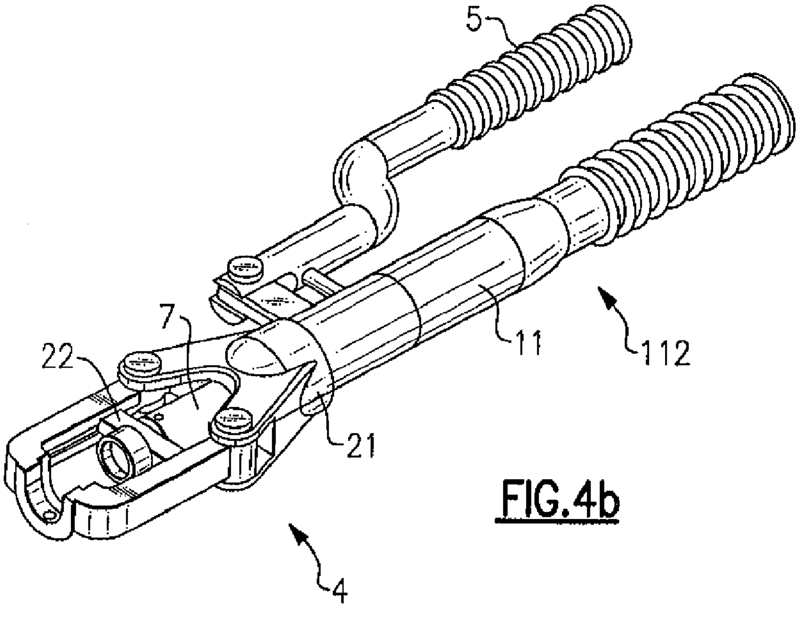

In another embodiment of the present invention, illustrated in FIGS. 4*a* and 4*b*, the hydraulic assembly can be provided by a manually operated hydraulic assembly, e.g., a hydraulic assembly model HCCX or HCCXC available from Greenlee Textron Inc. (Rockford, Ill.). The hydraulic assembly 112 can include a housing 11, a handle 5, a hydraulic fluid reservoir (not shown), and a hydraulic pump (not shown). The assembly 112 can further include a ram 7 which can be connected to an extendable ram (not shown) and can be extendable along the longitudinal axis of the housing 11 of the hydraulic assembly 12. The ram 7 can have an orifice 7*a* intended for connecting the ram to other parts by a pin of a suitable size.

The assembly 112 can have an outer surface 6, at least a portion of which can have external threads. The nut portion 21 of the connector frame assembly 4 can be threadably attachable to the externally threaded surface portion. The nut portion 21 can have an opening 23 to receive the ram 7. Orifices 7*a* and 7*b* can be aligned to insert a pin (not shown), thus connecting the ram 7 to the sliding bar 22. FIG. 4*b* illustrates connector frame assembly 4 attached to the hydraulic assembly 112.

Figure 5A:
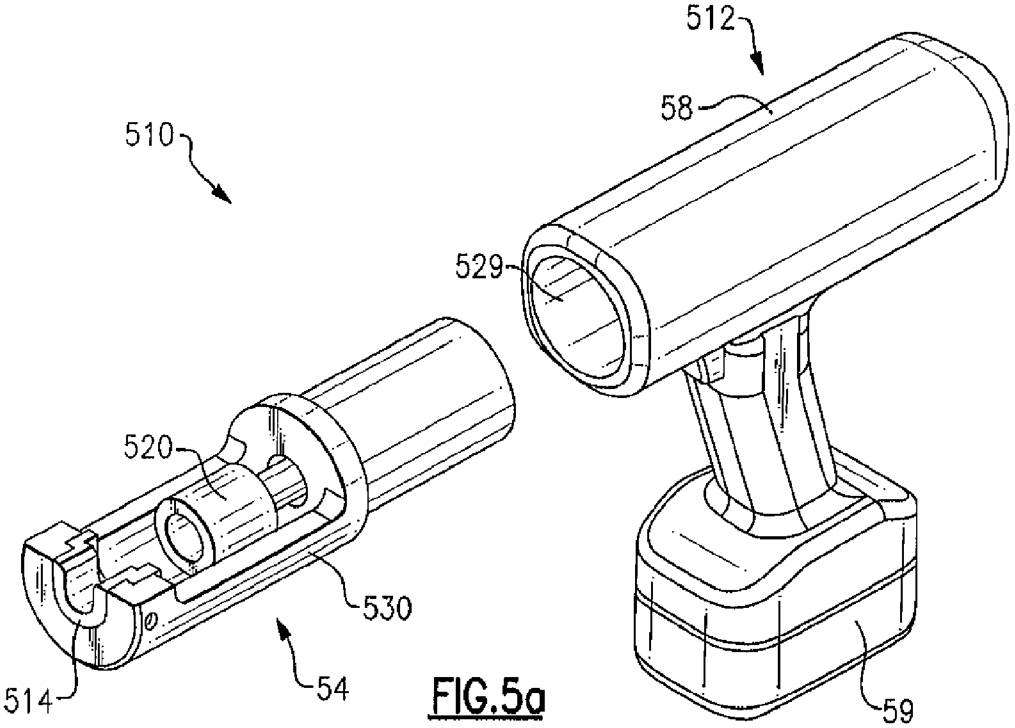
FIGS. 5*a*-5*c* illustrate another embodiment of a compression tool for installing a cable connector onto a coaxial cable.
Figure 5B:
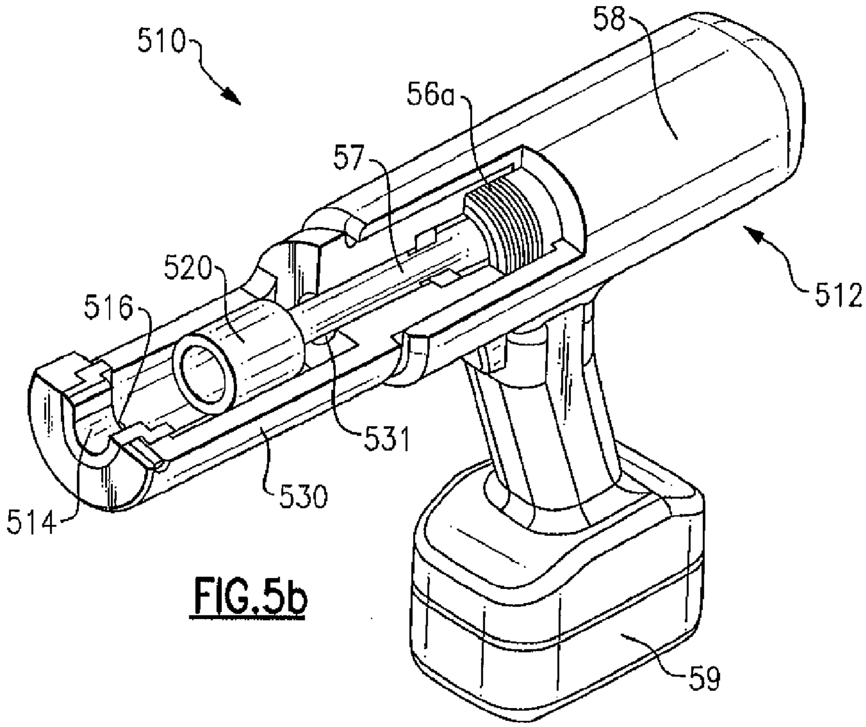
Figure 5C:
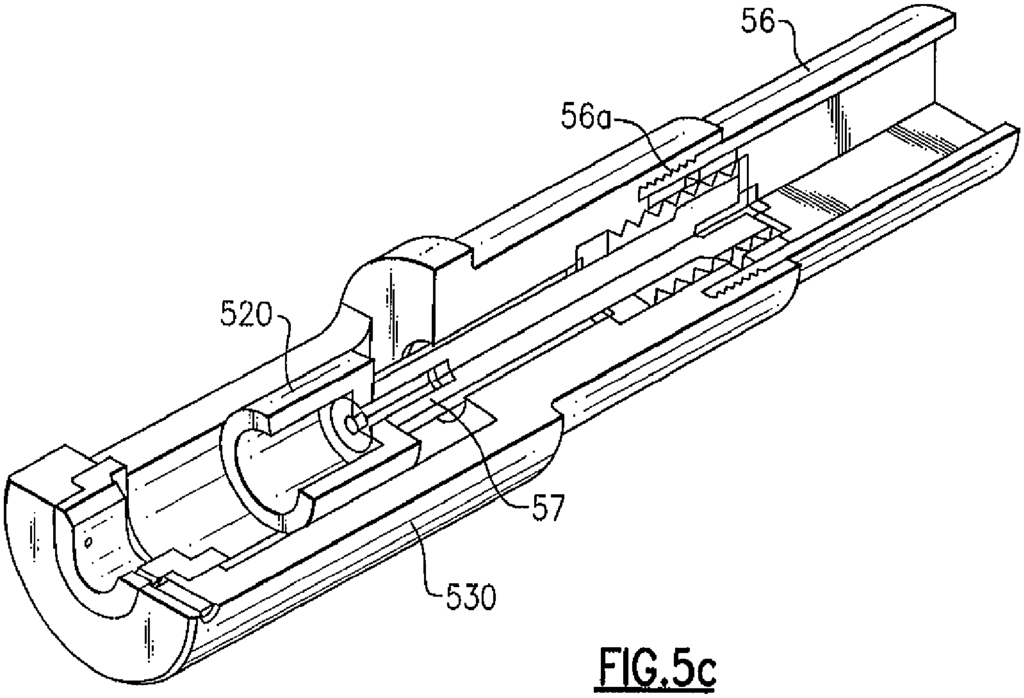

FIGS. 5*a*-5*c* illustrate another embodiment of a compression tool for installing a cable connector onto a coaxial cable, wherein the connector frame assembly is suitable for mounting to another type of a battery operated hydraulic compression assembly.

In one aspect, the compression tool 510 can include a battery-operated hydraulic assembly 12, which can be provided by a commercially available assembly, e.g., Compact 100-B available from Ridge Tool Company (Elyria, Ohio). The hydraulic assembly 512 can include a housing 58, a battery 59, an electric motor (not shown), a hydraulic fluid reservoir (not shown), and a hydraulic pump (not shown). As best viewed in FIG. 5*c*, the hydraulic assembly can further include a mounting cylinder 56, and a ram 57 which can be extendable along the longitudinal axis of the housing.

The compression tool 510 can further include a connector frame assembly 54. The connector frame assembly 54 can include a frame 530. A skilled artisan would appreciate the fact that the frame 530 can have form factors different from illustrated herein.

The connector frame assembly 54 can further include a cable cradle 514 attached to one end of the frame 530, best viewed in FIG. 5*b*. The cable cradle 514 can be configured to accommodate cables of various sizes. The cable cradle 514 can include a shoulder 516 for engaging one end of a cable connector. The other end of a cable connector can be received by a sleeve 520. The sleeve 520 can be configured to accommodate cable connectors of various sizes. The sleeve 520 can be attached to a extendable ram 57 by a bolt 521. Ram 57 can be received through an opening 531 in the frame 530.

In one aspect, the frame 530 can have internal threads at one end. The mounting cylinder 56 of the hydraulic compression assembly 512 can have an outer surface, at least a portion 56*a* of which can have external threads. The frame 530 can be threadably attachable to the externally threaded portion of the mounting cylinder 56.

Figure 6A:
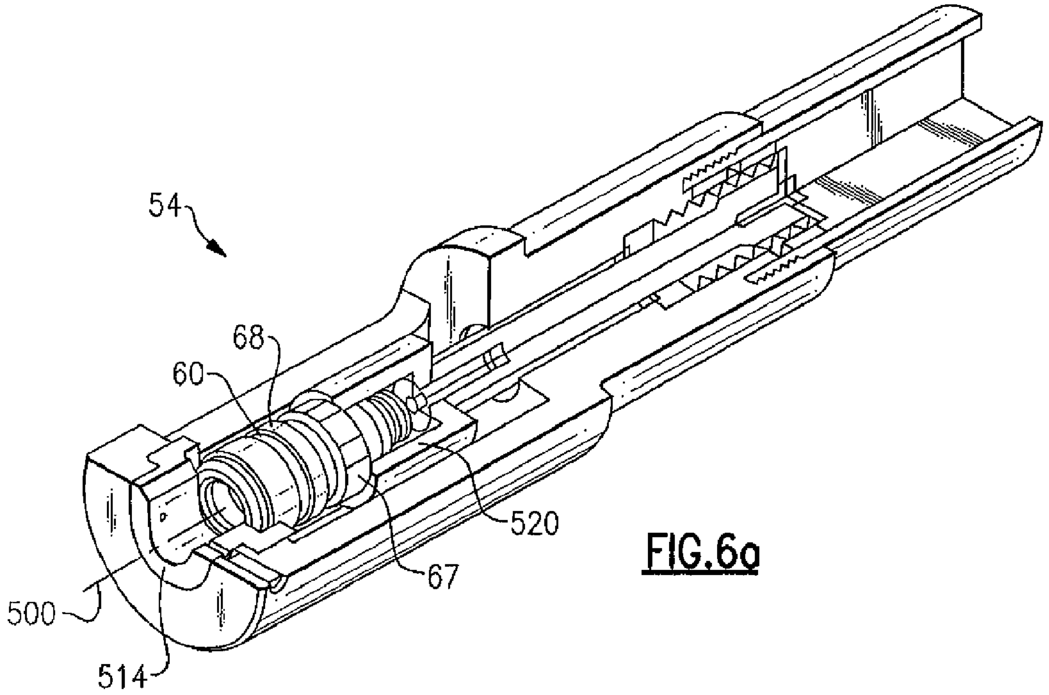
FIGS. 6*a* and 6*b* illustrate a cable connector being compressed by the hydraulic compression tool according to the embodiment of FIGS. 5*a*-5*c*.
Figure 6B:
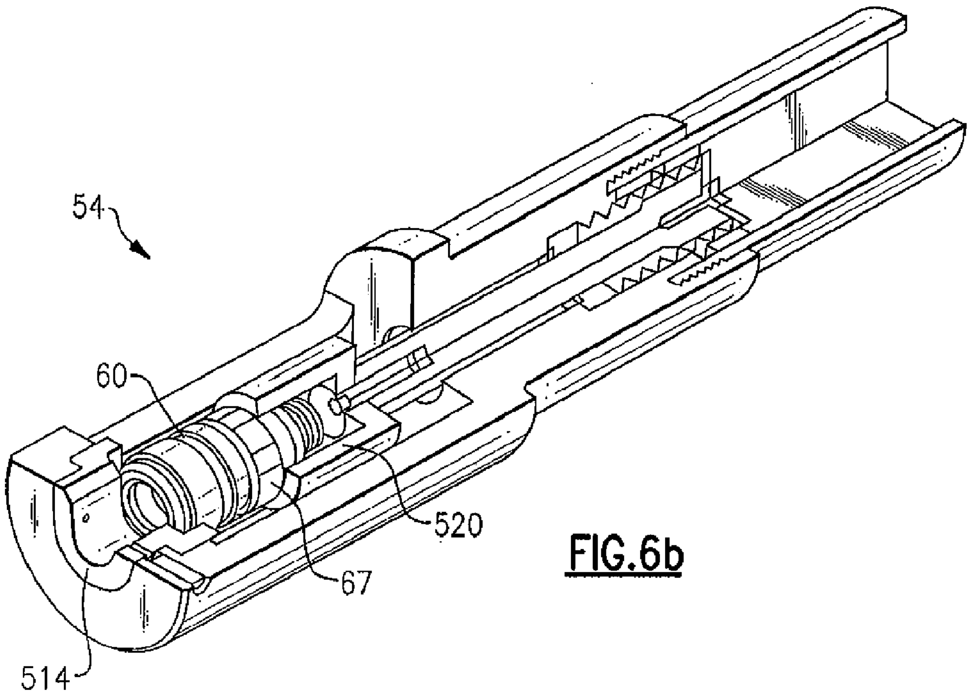

FIGS. 6*a* and 6*b* illustrate a cable connector before and after having being compressed by the hydraulic compression tool according to the embodiment of FIGS. 5*a*-5*c*. The cable connector 60 is placed into the connector frame assembly 54 so that the deformable section of the cable connector is received by the cable cradle 514, and the connector body 67 of the cable connector is received by the sleeve 520. A prepared end of coaxial cable (not shown) is inserted into the deformable section of the cable connector. The operator of the hydraulic compression tool activates the hydraulic assembly 512, so that the extendable ram 57 of the hydraulic assembly 512 extends, which results in the compression member 68 and connector body 66 being compressed along the longitudinal axis 500 of the cable connector, causing the coaxial cable being secured in operative engagement to the cable connector.

The invention claimed is:

1. A hydraulic compression tool for installing a cable connector onto a coaxial cable, the cable connector having a longitudinal axis, a connector body, and a compression member mounted on the connector body, the compression tool comprising:

a hydraulic assembly, the hydraulic assembly having an axially extendable ram;

a connector frame detachably attached to the hydraulic assembly, the connector frame having a cable cradle configured to accommodate the cable;

an opening for receiving the axially extendable ram; and a sleeve for engaging the cable connector, the sleeve being attachable to the axially extendable ram, whereby activating the hydraulic assembly extends the axially extendable ram along a longitudinal axis of the cable connector to move the sleeve along the longitudinal axis and cause compression of the compression member and the connector body into engagement with the cable.

2. The hydraulic compression tool of claim 1, wherein the sleeve is configured to accommodate connectors of various sizes.

3. The hydraulic compression tool of claim 1, wherein the hydraulic assembly is a battery operated assembly further comprising a battery, an electric motor, a hydraulic fluid reservoir and a hydraulic pump.

4. The hydraulic compression tool of claim 1, wherein the hydraulic assembly is a manually operated assembly further comprising a hydraulic fluid reservoir and a hydraulic pump.

5. The hydraulic compression tool of claim 1, wherein the hydraulic assembly has an outer surface at least a portion of which has external threads, wherein the connector frame further comprises a cylindrical portion with internal threads, the cylindrical portion being threadably attachable to the outer surface portion with external threads of the hydraulic assembly.

6. The hydraulic compression tool of claim 1, wherein the cable cradle has a shoulder for engaging one end of the cable connector.

* * * * *